UNITED STATES PATENT OFFICE.

CHRISTOPHER JAMES, OF SWANSEA, ENGLAND.

PROCESS OF REDUCING ZINC OR SPELTER FROM ORES.

SPECIFICATION forming part of Letters Patent No. 478,110, dated July 5, 1892.

Application filed August 18, 1891. Serial No. 403,043. (No specimens.)

*To all whom it may concern:*

Be it known that I, CHRISTOPHER JAMES, a subject of the Queen of Great Britain and Ireland, residing at Swansea, England, have invented an Improved Process of Reducing Zinc or Spelter from Ores, of which the following is a specification.

This invention relates to an improved method or process of producing metallic zinc from any ores or compounds containing the same, and has for its object the diminution of the usual known calcining operations, the utilization of the natural sulphur of the ore to assist or effect reduction, the employment of reverberatory or gas furnaces instead of the costly and troublesome retort-furnaces hitherto used, the greater percentage of metallic zinc covered from the ore, and the better collection of the zinc in a distinct condenser, avoiding the present heavy losses through cracked retorts, imperfect clay connections, and waste of metal in the retort refuse.

In the ordinary methods now in use zinc ores are calcined till all the zinc present either as carbonate or sulphide is changed to an oxide. This is then mixed with coal or other carbonaceous matter placed in retorts, a large number of which are arranged in the same furnace, and subjected to a great heat. The oxide of zinc formed by the calcination is reduced by the coal added to the charge, as expressed by the equation $2ZnO + C = 2Zn + CO_2$. The zinc thus reduced to metal is at once volatilized by the heat at which the furnace is worked and leaves as gas the gangue of the ore and the unconsumed coal. This gas is condensed in the cooler part of the retort and in suitable connections outside the retorts. This process is exceedingly wasteful and expensive. The zinc is only very partially reduced by the coal and so much zinc is left in the retort refuse that ores containing a large percentage of zinc cannot be profitably worked. Enormous losses occur through the cracking and breaking of the clay retorts, and the process is generally extravagant in labor, coal, and zinc.

In my new process described herein for the first step I calcine only a portion of the ore until all the sulphur is drawn off and all the zinc is oxidized to a high or low degree of oxidation. This calcined portion I mix with such a portion of raw zinc sulphide (blende) as will suffice when the whole is heated together, as a second step in my process, to reduce the whole of the oxide of zinc in the calcined portion itself, as well as the sulphide itself, by their mutual reaction to zinc and $SO_2$. The charge of mixed calcined and raw ore, as above, I put conveniently for the second step of my process in a reverberatory furnace in which I can maintain a neutral or partially-reducing atmosphere and in which I can apply any amount of heat without fear of loss from the breaking of clay retorts and consequent leakage. The zinc, entirely reduced by the reaction of the mixed oxides and sulphides, is perfectly volatilized by the high degree of heat maintained in the furnace. The volatilized zinc is conducted into a separate condensing-chamber surrounded by a water-jacket casing or partly filled with tubes, through which the zinc-gas passes, the tubes being surrounded with water. In the chamber or tubes the zinc is condensed and is then ladled out ready for the market.

The reduction as above described, where the sulphur in the ore is utilized in reduction, is more natural and perfect than when coal or similar carbonaceous matter is used. The reaction of my method is chemically expressed by the formula $2ZnO + ZnS = 3Zn + SO_2$—that is, two parts, by weight, of zinc oxide mechanically mixed with one part of zinc sulphide, when heated together, give all the zinc free and all the sulphur and oxygen combined as sulphurous anhydride.

One great superiority of this process arises from the collection and condensation of the zinc being effected in a large, distinct, and easily-accessible chamber or in an apparatus equally open to frequent examination, so that no loss of zinc takes place through leakage, while the small amount of oxide of zinc which may be formed by any free oxygen which can pass into the furnace I collect in suitable flues and chambers to be again used as calcined zinc ores. The expense of working such a furnace will be very small compared to the ordinary retort-furnace, the repairs much less, while the labor and loss of time caused by the breaking and consequent changing of damaged retorts are entirely avoided.

By my above method of reduction ores containing less than ten per cent. of zinc can be profitably worked, in consequence of the decreased cost following the use, to effect reduction of the natural sulphur of the ore in lieu of coal, which latter is not only expensive itself, but renders the retort refuse unfit for any after treatment for the recovery of other metals than zinc contained in the ore. By my method the refuse from the retorts or furnace will be in a better condition for further treatment, while very nearly all the zinc originally present in the ore is driven off and condensed.

It is obvious that my process, as far as the utilization of the natural sulphur of the ores to effect the reduction of the oxide of zinc, might be carried on in the ordinary retorts with some advantage as regards the present system of extreme calcination and subsequent carbonization for reduction; but a much better advantage would be obtained by the use of reverberatory or gas furnaces, as hereinbefore described.

I do not pretend to claim as novel or unknown the chemical fact that $2ZnO$ and $ZnS$ when heated together will produce zinc and $SO_2$.

Having now described my invention, what I claim is—

A process for the commercial treatment of zinc-sulphide ores, consisting in first calcining a part of the ore in a calcining-furnace to the form of an oxide, mixing the calcined ore with rather more than half its weight of crude ore, and smelting the same in the hearth of a neutral or slightly-reducing reverberatory furnace until reduced to zinc and $SO_2$, the zinc being volatilized and collected by condensation in a chamber distinct from the furnace, substantially as described.

In testimony whereof I have signed my name to this specification in the presence of two subscribing witnesses.

CHRISTOPHER JAMES.

Witnesses:
JOHN C. FELL,
RICHARD A. HOFFMANN.